United States Patent [19]

Spier

[11] 3,780,784
[45] Dec. 25, 1973

[54] EXPANDABLE TIRE RETAINER ASSEMBLY
[75] Inventor: Carl P. Spier, Yellow Springs, Ohio
[73] Assignee: The United States of America as represented by the Secretary of the Air Force, Washington, D.C.
[22] Filed: June 7, 1972
[21] Appl. No.: 260,646

[52] U.S. Cl. .................................... 157/1, 152/400
[51] Int. Cl. .............................................. B60c 17/00
[58] Field of Search ......................... 157/1, 1.1, 1.7; 152/399, 400, 401

[56] References Cited
UNITED STATES PATENTS
3,018,809  1/1962  Bernard .............................. 152/400
FOREIGN PATENTS OR APPLICATIONS
555,754  9/1943  Great Britain ...................... 152/400

Primary Examiner—Granville Y. Custer, Jr.
Assistant Examiner—Harold P. Smith, Jr.
Attorney—Harry A. Herbert, Jr. et al.

[57] ABSTRACT

A retainer assembly for use with expandable tires wherein a pair of circular metallic bands having a plurality of tabs extending radially outward therefrom are positioned around the wheel rims such that the tabs are located nearly adjacent the tire beads. A hollow spreader bar is positioned between the bands at each tab location and a headed stud is passed through the tab inwardly into the spreader bar to maintain the tabs in spread condition which, in turn, holds the tire beads against the tapers or flanges of the wheel rim during the mounting process and would also operate to retain the tire on the wheel if and when an emergency "run-flat" condition existed.

3 Claims, 3 Drawing Figures

EXPANDABLE TIRE RETAINER ASSEMBLY

BACKGROUND OF THE INVENTION

This invention relates to a retainer assembly and arrangement for use with expandable tires and, more particularly, the invention is concerned with providing a means for holding the beads of an expandable tire against the flanges of the wheel rim during the mounting operation and operates to retain the tire on the wheel during the application of adversely applied forces especially if and when it becomes necessary to function satisfactorily in the absence of inflation pressure.

For many years pneumatic tires have had the same general shape and size for a particular application, regardless of whether they were "tubetype" or of the "tubeless" variety. More recently, a tubeless expandable tire has been developed and is employed by the automotive industry (usually as "spare" tires) where it is desired to utilize the space-saving characteristics provided by this new construction. This space-saving for stowage has been achieved by convoluting the tire sidewalls during the molding process so that the tread surface is much closer to the beads than is usual with standard tires. When these new tires are inflated from a compressed gas source, the "bellows-like" action of the convoluted sidewalls permits them to distend and assume a configuration which is nearly identical to that of standard tires. Moreover, these sidewalls have a fairly strong "memory" and behave like springs to restore the tires to the "as-molded" configuration when they are subsequently deflated.

Most recently, expandable tires have been proposed and tested for use on a variety of military vehicles, including aircraft. They are attractive for these purposes for several reasons in addition to the reduced space required for stowage, storing, and shipping. Tests have indicated that their usefulness extends over a significantly wider pressure range than is the case with conventional tires. This permits adjusting their inflation pressures to be most compatible with the loads to be carried and the terrain to be traversed. In an emergency when they might have lost carcass integrity and are unfit to retain any internal pressure, they can be "run-flat" more successfully than standard tires because they form essentially solid bands on the wheel which will support a significant load without "squirming" or being subject to stripping due to rim cuts.

Tests, however, have indicated that there are fundamental difficulties associated with retaining fully deflated expandable tires in their normal position on the wheels. It should be noted that the automotive industry developed "safety-rim" wheels to retain conventional tires after a blowout and that these same wheels are used successfully with expandable tires at present.

It should also be noted that most automobile tires are presently forced over the outer edge of the wheel rim during the mounting process whereas most larger tires are assembled to wheels which employ two halves inserted through the tire center holes just inside the beads. The wheel halves employ a circumferential seal for retaining air in the tires, and after the halves are bolted together the tire is inflated to "seal" the beads on the wheel. This method of mounting is utilized whenever the beads of the tire would be too stiff to force or could be adversely affected by forcing over the rim. Standard wheel-half construction includes a taper over which the tire bead is stretched during the seating process so that a tight seal may be obtained in this area.

SUMMARY OF THE INVENTION

The present invention is concerned with providing a coherent assembly of bars and bands which form a system to push the tire beads to the extremities of the wheel tapers during the mounting process and serve to retain them there during the application of adversely applied forces. The retaining pressure is maintained despite the absence of any inflation pressures and locks the tire into the wheel corner formed between the end of the taper and the rim.

Accordingly, it is an object of the invention to provide a new and improved device for quickly and easily mounting an expandable tire upon a two-piece wheel by applying a spreading force to the inside of the tire at the bead.

Another object of the invention is to provide a new and improved means for maintaining an expandable tire on the rim after the internal air pressure has been lost and while running at high speed under heavy load.

Still another object of the invention is to provide an expandable tire retainer assembly that is suitable for use on aircraft. The present assembly can be made of strong lightweight material and should not adversely affect the balance of the wheel.

A better understanding of the invention together with a fuller appreciation of its advantages will be gained from the following description given in connection with the drawings wherein like reference numrals are used throughout to identify like elements.

IN THE DRAWINGS

DESCRIPTION OF A PREFERRED EMBODIMENT

Figure 1:
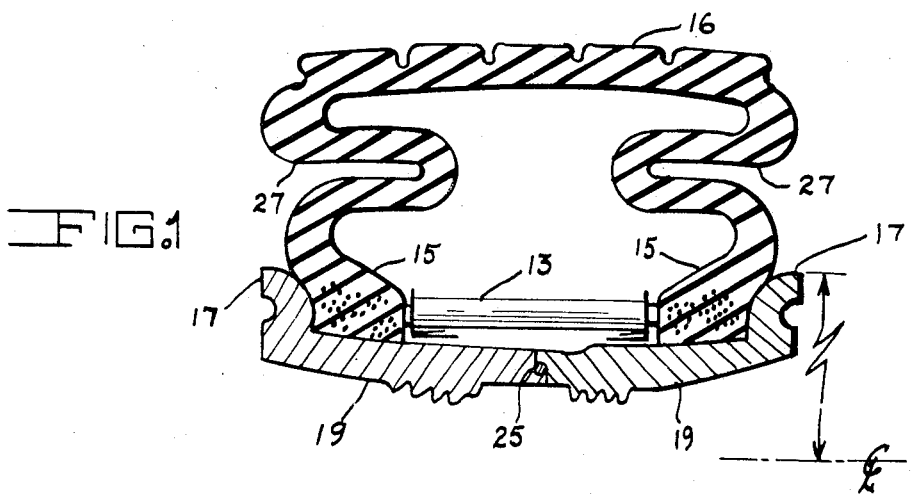
FIG. 1 is a cross-sectional view of an expandable tire mounted on an aircraft wheel. A spreader bar and band system is shown holding the tire in intimate contact with the adjacent wheel surfaces.

Referring now to the drawings, the hereinafter disclosed expandable tire retainer assembly includes a spacer bar 13 wedged between the beads 15 of the tire 16 to force them against the rims 17 of the wheel halves 19 during the mounting process. The bars 13 prevent inward movement (away from the rim 17) of the beads 15 as would otherwise occur upon application of most external forces to the tire 16. Moreover, frictional forces are induced between the beads 15 and the rim 17 by the bars 13 and serve to resist centrifugal forces during rapid rotation. The bars 13 are held in position at the tabs 21 on two bands 23 which extend completely around the wheel halves 19 just inside the tire beads 15. Contacting surfaces outside the tabs 21 serve to transmit forces passing through the tabs 21 from the bars 13 to the tire beads 15. The usual O-ring 25 seals the wheel halves 19 so that inflation of the tire can be accomplished to fully seal the tire 16 between the bar contact points and so that the convoluted sidewall 27 may be extended in the usual fashion whenever applicable.

Figure 2:
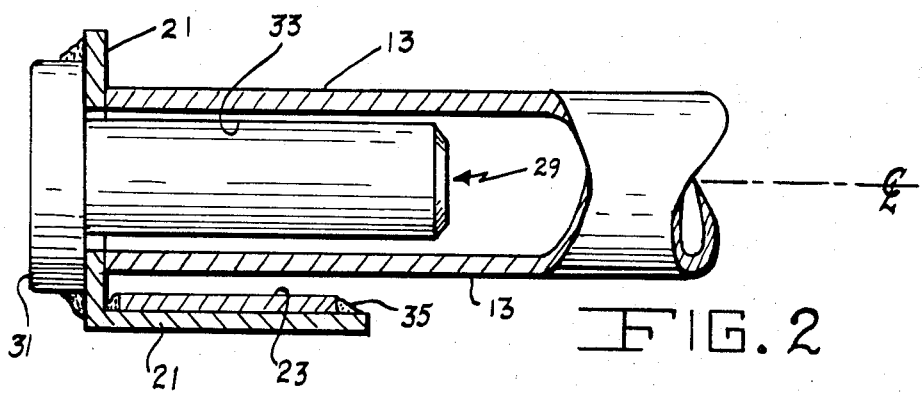
FIG. 2 is an enlarged cross-sectional view of one end of the spreader bar system showing one suggested method of constructing the assembly.

A system for holding the spacer bar 13 in position at the tab 21 is shown in the enlarged cross-sectional view of FIG. 2. In this example a stud 29 is secured to the tab 21 in such a fashion that its head 31 bears against the tire bead 15 while the shank 33 passes through the tab 21 and enters the bar 13 so that centrifugal forces can be effectively resisted. The tab 21 is shown passing under the band 23 and secured to it by the welds 35. This arrangement also provides resistance to centrifugal forces. It should be noted that the tabs 21 could be made integral with the bands 23 and that the tabs 21 could be placed outside the bands 23 rather than under them. However, in this latter arrangement the centrifugal forces would act on the bond 35 rather than on the band 23. It should also be noted that other stud configurations are possible including the use of bolts passing the tabs 21, which bolts could be threaded into the spreader bars 13. Moreover, the bars 13 are not required to be hollow for any portion of their length since they could be made to enter the studs as easily as the converse shown which employs the full-length hollow bars 13 to obtain the best strength-to-weight ratio to resist the effects of end and/or side applied loads.

Figure 3:
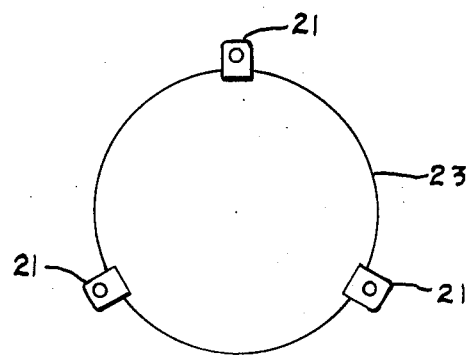
FIG. 3 is a greatly reduced view showing a complete band, from the edge, and a suggested positioning for the spreader bars.

FIG. 3 shows a band 23 with three equally spaced tabs 21 for securing spreader bars. Three bars are sufficient to substantially lock the tire 16 to the wheel 19. More tabs 21 and bars 13 would enhance this effect, although the point of diminishing returns with respect to added weight would probably be reached with eight or more bars employed. The bands 23, with their protruding tabs 21, must be sufficiently deformable to be passed through the center hole of the tire 16 and then manipulated into the nominal "air space" within the tire in a substantially round or "hoop-like" configuration. The bands 23 should be snug on the wheel 19, as indicated in FIG. 1, to prevent unbalance and to hold the bars 13 in the desired position. They must also be loose enough on the wheel 19 to prevent marring the surface during assembly and use. Also, the bands 23 should have sufficient strength to resist centrifugal forces induced during high speed rotation of the tire and wheel assembly.

MODE OF OPERATION

In operation, the retainer assembly for expandable tires according to the invention is shown in assembled condition in FIG. 1. The particular sequence of assembling the various components including the tire 16, the wheel elements 19 and 25 and the retainer assembly is not significant with respect to ensuring the desired results and may be varied to suit the convenience of the assembler. One technique for obtaining the configuration shown in FIG. 1 is submitted for illustrative purposes and includes the following operational steps.

First, deform the bands 23, pass them through the center hole of the tire 16, and position them in an essentially round configuration with the tabs 21 capable of being brought adjacent to the tire beads 15 on each side.

Second, install the spreader bars 13 between the bands. If the band tabs 21 utilize premounted studs 29 (as in FIG. 2), it may be necessary to spread the tire beads 15 to provide sufficient space for slipping the stud shank 33 into the spreader bar 13. If bolts are employed, it will be necessary to have one tab at a time in view through the tire center hole so that the bolt can be inserted and threaded.

Third, position the retainer assembly so that no portion thereof will interfere with the entrance of the wheel halves 19 into the tire 16. Proceed with the installation of the wheel halves 19 and O-ring 25 in the usual fashion. If bolts have not been used to unitize the retainer assembly, it may be necessary to employ external auxiliary clamping to insure that its integrity is maintained through the procedures of aligning and securing the wheel halves 19.

A properly assembled tire and wheel with internal retainer installed will have unique areas of pressure between the tire wheel at each spreader bar when the wheel bolts have been properly torqued. These pressure points will distinguish this type of assembly from one which does not contain a retainer and they will improve substantially the probability of the tire remaining in position on the wheel under adverse circumstances.

The contact areas of the studs, of course, should be smooth and/or rounded to prevent tire tearing and the bar lengths should be optimized to provide the desired retention pressure without unduly stressing the wheel rim locally. As an added feature, the tabs and/or spreader bars could include extensions to lap over portions of the tire beads to increase the resistance to centrifugal displacement. All parts should be designed to be as light as possible, to provide reasonable system balance to provide the holding pressure close to the wheel drum, and to have adequate strength and fatigue resistance to be serviceable in the severely adverse environment anticipated.

Although the invention is described above in connection with expandable tires used on standard two-part aircraft wheels, it is also applicable wherever it may be desirable to provide pressures inside a tire which cannot be otherwise provided. Thus, the described assembly could be utilized with any two-piece wheel to provide pressures to the beads of standard tires. Multipiece bands with spacers could be preassembled on one-piece wheels to provide internal pressure to any tire. Moreover, of greatest significance, this invention permits the inherent "run-flat" capabilities of the expandable tires to be fully exploited by utilizing any appropriate wheel of the correct size, which may be in stock or inventory, and obviates the necessity for designing, testing, and qualifying new wheels specifically intended for this purpose.

The herein disclosed version of the invention has been successfully tested for the United States Air Force. This version, which included soft steel bands, tabs, studs, and hollow spreader bars fabricated and secured as illustrated in FIGS. 1, 2, and 3, withstood repeated "run-flat" tests on a dynamometer, many normal landings and take-offs with a test-bed aircraft, and provided the pilot with full aircraft control during one landing following a high-speed blowout caused by a locked brake. This control could not have been anticipated without the use of this invention. The equipment was always reusable following tire failures.

It is apparent that variations from the basic tested and described techniques have also been described and that other variations are equally feasible. For example, the bands could be made of spring steel or could be made without overlap. Moreover, other bonding techniques, such as brazing or riveting, could be employed without altering the basic premise or intent of the invention.

The above description of the invention is intended in illustration and to so instruct others skilled in this art that they will be enabled to modify and select alternatives best suited for each particular use. Various changes and modifications from the embodiments of the invention specifically described will occur to those skilled in the art and can be made without departing from the spirit or scope of the invention as set forth.

Having thus described my invention, what I claim and desire by Letters Patent of the United States is:

1. A retainer assembly for use in mounting and retaining an expandable pneumatic tire in combination with a pair of complementary wheel halves each having a tapered rim portion thereon, said retainer assembly comprising a plurality of rigid spreader bars for positioning between the beads of the expandable tire, a pair of circular bands extending around the wheel halves near the tire beads, a plurality of tabs extending radially outward from the outer edge of said bands, said tabs being fixedly attached at corresponding opposite circumferential positions on each of said bands, and means at each of said tabs for holding said spreader bars in parallel relationship to one another and perpendicular to the tire beads, thereby holding the tire beads against the tapers of the wheel rim during the mounting process and operating to retain the tire on the wheel during adverse run-flat conditions.

2. The retainer assembly defined in claim 1 wherein said circular bands are dimensioned to have an internal diameter slightly larger than the nominal diameter of the wheel such that said bands fit snugly on the wheel while having sufficient clearance to allow assembly of wheel elements.

3. The retainer assembly defined in claim 1 wherein the means for holding the spreader bars in position between the tire beads includes a plurality of studs each having a shank and head portion, circular openings in each of said tabs, the shank portion of each of said studs passing inwardly through the opening in each of said tabs and engaging the ends of said spreader bars, and the head portion of each of said studs being disposed between said tabs and the inside of the tire beads.

* * * * *